US012587838B2

(12) United States Patent
Carter et al.

(10) Patent No.: US 12,587,838 B2
(45) Date of Patent: Mar. 24, 2026

(54) ENCRYPTED END-TO-END MESSAGING USING NEAR-FIELD COMMUNICATION (NFC) TAGS

(71) Applicant: International Business Machines Corporation, Armonk, NY (US)

(72) Inventors: Simon Carter, Southampton (GB); Mark Argent, Watford (GB); Sarah Neenan, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 18/381,975

(22) Filed: Oct. 19, 2023

(65) Prior Publication Data

US 2025/0133392 A1 Apr. 24, 2025

(51) Int. Cl.
| | |
|---|---|
| *H04W 4/80* | (2018.01) |
| *H04L 9/14* | (2006.01) |
| *H04W 12/00* | (2021.01) |
| *H04W 12/03* | (2021.01) |
| *H04W 12/033* | (2021.01) |

(Continued)

(52) U.S. Cl.
CPC ............. *H04W 12/033* (2021.01); *H04L 9/14* (2013.01); *H04W 12/009* (2019.01)

(58) Field of Classification Search
CPC .... H04W 12/033; H04W 12/009; H04L 9/14; H04L 9/0822; H04L 9/0825; H04L 9/0894; H04L 2209/805
See application file for complete search history.

(56) References Cited

U.S. PATENT DOCUMENTS

| | | | | |
|---|---|---|---|---|
| 10,104,542 | B2 * | 10/2018 | Tahan | ................... H04L 9/0637 |
| 11,044,080 | B2 | 6/2021 | Rodriguez et al. | |
| 11,356,252 | B1 | 6/2022 | Islam et al. | |

(Continued)

FOREIGN PATENT DOCUMENTS

CN          114449505 A  *  5/2022  .............. H04W 4/80

OTHER PUBLICATIONS

Castello Govender, Brett van Niekerk; "Secure Key Exchange by NFC for Instant Messaging"; 2021 Conference on Information Communications Technology and Society (ICTAS); Year: Jun. 2021; Conference Paper; Publisher: IEEE; pp. 27-33 (Year: 2021).*

(Continued)

*Primary Examiner* — Fatoumata Traore
*Assistant Examiner* — Courtney D Fields
(74) *Attorney, Agent, or Firm* — Zilka-Kotab, P.C.

(57) ABSTRACT

A computer-implemented method, according to one embodiment, includes using a first symmetric key to encrypt a first private key of a first asymmetric key pair, and storing the encrypted first private key on a predetermined near-field communication (NFC) tag. The method further includes storing a first public key of the first asymmetric key pair and the first symmetric key on a predetermined central repository, and obtaining an encrypted first message and an encrypted first group key from the central repository. The encrypted first message was encrypted using the first group key, and the encrypted first group key is the first group key encrypted using the first public key. The method further includes using the encrypted first private key stored on the predetermined NFC tag to decrypt the encrypted first message.

14 Claims, 6 Drawing Sheets

(51) Int. Cl.
  *H04L 9/06*          (2006.01)
  *H04W 12/02*          (2009.01)

(56)          References Cited

U.S. PATENT DOCUMENTS

| | | | |
|---|---|---|---|
| 11,416,633 | B2 | 8/2022 | Schmatz et al. |
| 11,444,755 | B2 * | 9/2022 | Christensen .............. H04L 9/14 |
| 11,475,140 | B1 | 10/2022 | Buonora |
| 2016/0380768 | A1 * | 12/2016 | Koike ....................... H04L 9/30 |
| | | | 380/277 |
| 2017/0180985 | A1 | 6/2017 | Holleis |
| 2017/0244556 | A1 | 8/2017 | Wold et al. |

OTHER PUBLICATIONS

IBM, "About encryption keys," IBM, Feb. 8, 2022, 3 pages, retrieved from https://www.ibm.com/docs/en/ts11xx-tape-drive?topic=STPRH6/com.ibm.storage.drives.doc/top_tscom_reuse_encryptoview_keys.htm.

* cited by examiner

100

ENCRYPTED END-TO-END MESSAGING USING NEAR-FIELD COMMUNICATION (NFC) TAGS

BACKGROUND

The present invention relates to encryption, and more specifically, this invention relates to encrypted end-to-end messaging using near-field communication (NFC) tags.

An encryption key is typically a random string of bits generated specifically to scramble and unscramble data. Encryption keys are created with algorithms designed to ensure that each key is unique and unpredictable. The longer the key is constructed this way, the harder it is to break the encryption code. Several methods of encryption use 256-bit Advanced Encryption Standard (AES) algorithm keys to encrypt data.

Two types of encryption algorithms can be used by an encryption key server: symmetric algorithms and asymmetric algorithms. Symmetric, or secret key encryption, uses a single key for both encryption and decryption. Symmetric key encryption is used for encrypting relatively large amounts of data efficiently. 256-bit AES keys are symmetric keys. Asymmetric, or public/private encryption, uses a pair of keys. Data encrypted with one key are decrypted only with the other key in the public/private key pair. When an asymmetric key pair is generated, the public key is typically used to encrypt, and the private key is typically used to decrypt.

SUMMARY

A computer-implemented method, according to one embodiment, includes using a first symmetric key to encrypt a first private key of a first asymmetric key pair, and storing the encrypted first private key on a predetermined near-field communication (NFC) tag. The method further includes storing a first public key of the first asymmetric key pair and the first symmetric key on a predetermined central repository, and obtaining an encrypted first message and an encrypted first group key from the central repository. The encrypted first message was encrypted using the first group key, and the encrypted first group key is the first group key encrypted using the first public key. The method further includes using the encrypted first private key stored on the predetermined NFC tag to decrypt the encrypted first message.

A computer program product, according to another embodiment, includes a computer readable storage medium having program instructions embodied therewith. The program instructions are readable and/or executable by a computer to cause the computer to perform the foregoing method.

A system, according to another embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
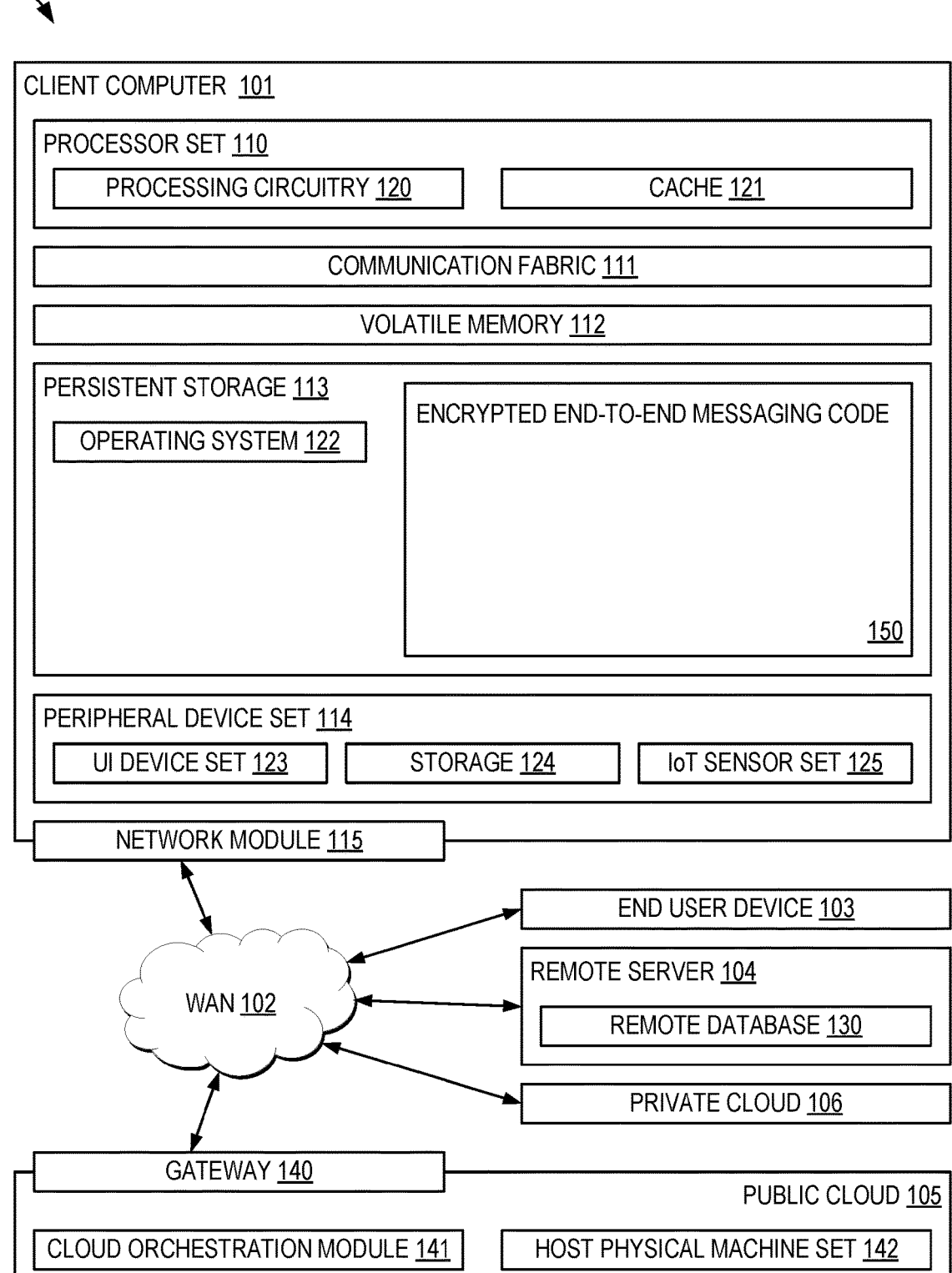
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for encrypted end-to-end messaging using near-field communication (NFC) tags.

In one general embodiment, a computer-implemented method includes using a first symmetric key to encrypt a first private key of a first asymmetric key pair, and storing the encrypted first private key on a predetermined near-field communication (NFC) tag. The method further includes storing a first public key of the first asymmetric key pair and the first symmetric key on a predetermined central repository, and obtaining an encrypted first message and an encrypted first group key from the central repository. The encrypted first message was encrypted using the first group key, and the encrypted first group key is the first group key encrypted using the first public key. The method further includes using the encrypted first private key stored on the predetermined NFC tag to decrypt the encrypted first message.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as encrypted end-to-end messaging code of block 150 for encrypted end-to-end messaging using near-field communication (NFC) tags. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, an encryption key is typically a random string of bits generated specifically to scramble and unscramble data. Encryption keys are created with algorithms designed to ensure that each key is unique and unpredictable. The longer the key is constructed this way, the harder it is to break the encryption code. Several methods of encryption use 256-bit Advanced Encryption Standard (AES) algorithm keys to encrypt data.

Two types of encryption algorithms can be used by an encryption key server: symmetric algorithms and asymmetric algorithms. Symmetric, or secret key encryption, uses a single key for both encryption and decryption. Symmetric key encryption is used for encrypting relatively large amounts of data efficiently. 256-bit AES keys are symmetric keys. Asymmetric, or public/private encryption, uses a pair of keys. Data encrypted with one key are decrypted only with the other key in the public/private key pair. When an asymmetric key pair is generated, the public key is typically used to encrypt, and the private key is typically used to decrypt.

Conventional encryption use cases do not enable verifiable end-to-end encrypted messaging between edge devices without a need for storing applications or keys on the edge device and ensuring that any data persisted in the cloud is encrypted and not accessible by any third parties or cloud providers. In order to mitigate these deficiencies, the techniques of embodiments and approaches described herein enable verifiable end-to-end encrypted messaging between edge devices by utilizing web-hosted applications, client browser cryptography functions, and NFC tags. This utilization enables data encryption keys to be generated in memory on a local device, enveloped and stored off device on an NFC tag. Meanwhile, the encrypted data is safely stored in a predetermined zero trust infrastructure, e.g., such as a public cloud. The integrity and authenticity of a message is then verified through digital signatures, as will be described in greater detail below.

Figure 2:
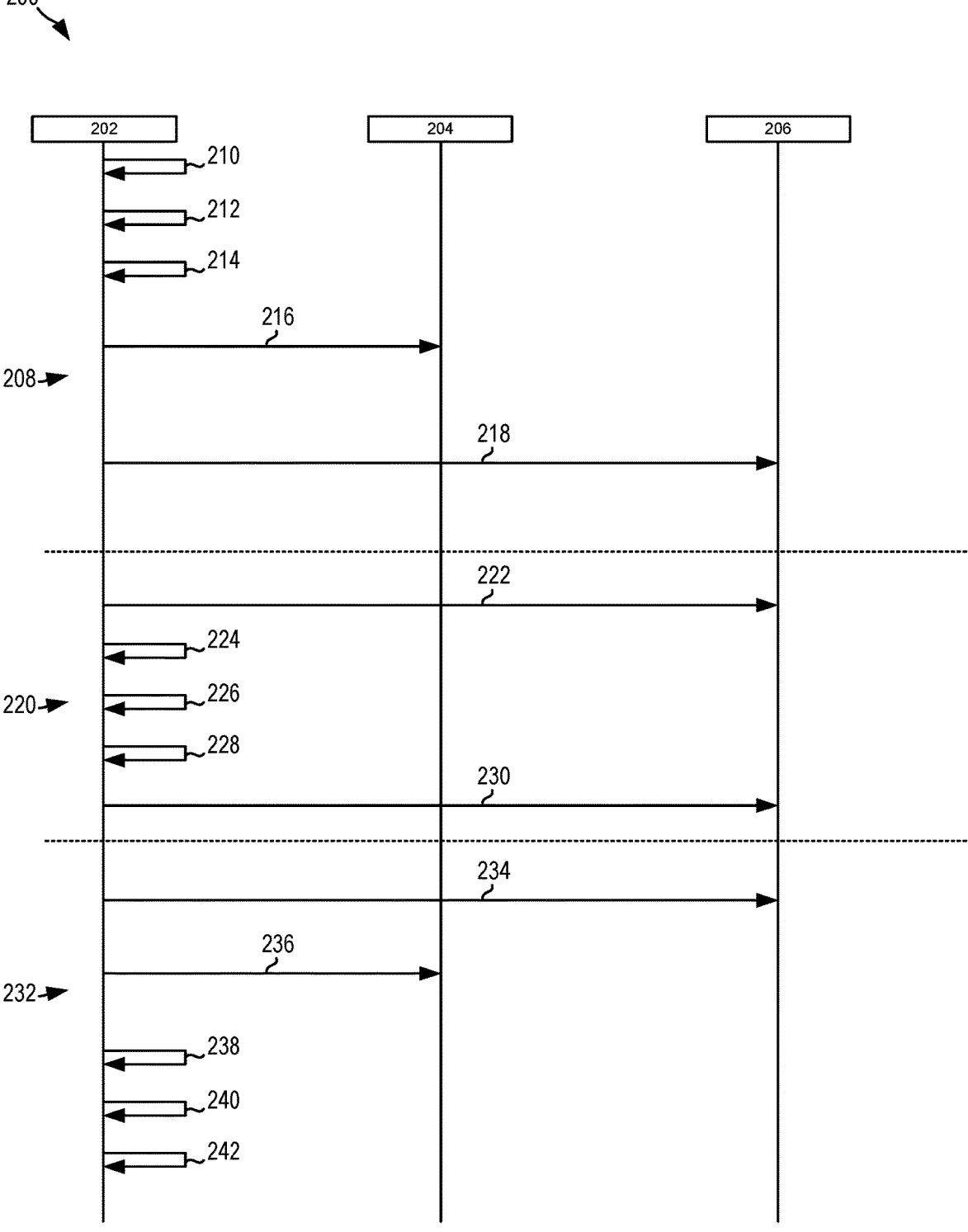
FIG. 2 is a flowchart of a method, in accordance with one embodiment of the present invention.

Now referring to FIG. 2, a flowchart of a method 200 is shown according to one embodiment. The method 200 may be performed in accordance with the present invention in any of the environments depicted in FIGS. 1-5, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that FIG. 2 incorporates perspectives of a first user device 202 with respect to an NFC tag 204 and a predetermined central repository 206. Depending on the approach, the first user device 202 may be a known type of end device that would become apparent to one of ordinary skill in the art after reading the descriptions herein, e.g., an end device, a laptop computer, a cellular phone, a tablet, etc. More specifically, in some approaches, the operations of method 200 may be performed on the first user device by a web browser, which may be of a type that would become apparent to one of ordinary skill in the art after reading the descriptions herein. The predetermined central repository 206 is, in some preferred approaches, considered a zero trust infrastructure. For example, in one or more of such approaches, the predetermined central repository 206 is public cloud storage.

A first portion 208 of the flowchart of method 200 may be based on a registration of user devices. For example, various operations of the first portion 208 of the flowchart of method 200 register the first user device 202 with a predetermined service associated with method 200, where the predetermined service may be used by registered devices for encrypted end-to-end messaging using NFC tags. The first portion 208 of the flowchart includes creating a first asymmetric key pair, e.g., see operation 210. In some preferred approaches, the first asymmetric key pair includes a first public key and a first private key. A first symmetric key is additionally created, in some preferred approaches, e.g., see operation 212. One or more of such keys may be created using techniques that would become apparent to one of ordinary skill in the art after reading the descriptions herein.

Operation 214 includes using the first symmetric key to encrypt the first private key of the first asymmetric key pair. The encryption may be performed using encryption techniques that would become apparent to one of ordinary skill in the art after reading the descriptions herein. An encrypted first private key results from the symmetric encryption.

The encrypted first private key is, in some approaches, stored on a predetermined NFC tag, e.g., see operation 216. The predetermined NFC tag may, in some approaches, be about the size of an average coin, and may be configured to be coupled to a keychain and/or identification badge for carrying by a user associated with and/or that uses the first user device. For context, storing the encrypted first private key on the NFC tag instead of on the user device relatively decreases the likelihood of an unauthorized user gaining access to the encrypted first private key in the event that the first user device is compromised, e.g., hacked, and/or physically obtained by an unauthorized user and/or program.

Method 200 additionally and/or alternatively includes storing the first public key of the first asymmetric key pair and the first symmetric key on the predetermined central repository, e.g., see operation 218.

A second portion 220 of the flowchart of method 200 is based on a process for causing the first device and/or a web browser of the first device to generate and store an encrypted messages for at least a second user device, e.g., where the second user device is the intended "recipient" of the encrypted message. In order to generate an encrypted message for the second user device, method 200 includes accessing, on the central repository, a public key (hereafter in method 200 referred to as the "second user device's public key") that is created by a second user device and stored on the predetermined central repository by the second user device, e.g., see operation 222.

Operation 224 includes creating a group key, e.g., a symmetric group key hereafter in method 200 referred to as the "second user device's group key". The second user device's group key is preferably created using the web browser of the first user device. The second user device's group key is used to encrypt a message intended for the second user device (hereafter in method 200 referred to as the "message intended for the second user device"). In some approaches, the second user device's group key is used to symmetrically encrypt the message intended for the second user device using symmetric encryption techniques that would become apparent to one of ordinary skill in the art after reading the descriptions herein, e.g., see operation 226. The encrypted message intended for the second user device results from performing this symmetric encryption. The second user device's group key is, in some preferred approaches, encrypted using the second user device's public key, e.g., see operation 228.

Operation 230 includes storing the encrypted message intended for the second user device and the second user device's encrypted group key to the predetermined central repository for the second user device to thereafter access. The second user device may obtain and decrypt the encrypted message intended for the second user device using operations similar to those that are described below in a third portion 232 of the flowchart of method 200.

It should be noted that, although various operations described herein are performed with respect to generating keys for providing an encrypted message for a single user device and associated user, in some other approaches, the operations may be additionally and/or alternatively performed with respect to a plurality of users. In other words, method 200 may, in some approaches, accommodate encrypting a message for a plurality of user devices, e.g., selected recipients. Accordingly, although some approaches herein detail that a second user device's keys may be unique to, and thereby associated with a second user that is associated with and/or uses the second user device, in some other approaches, keys may be generated for a plurality of recipients. For example, in some approaches, a message may additionally and/or alternatively be created by the first user device (the sender of the message), and the browser of the first user device may be caused to create and encrypt the message with a symmetric key. An indication, e.g., instructions, of user devices that are authorized to access and thereby read the message may be received, and the browser of the first device may be caused to encrypt the message's symmetric key with the public keys of the intended recipient user devices, e.g., based on accessing these public keys on the predetermined central repository. Accordingly, an encrypted group key is generated for each recipient user device. Thereafter, the browser of the first user device is caused to store the encrypted message, the encrypted group key, the NFC key and the public keys on the predetermined central repository on a zero trust infrastructure, e.g., a public cloud.

Referring now to the third portion 232 of the flowchart of method 200, it may be prefaced that various operations may be performed for decrypting an encrypted message that is encrypted by another device, e.g., by a web browser of the second device, and stored on the predetermined central repository for the first user device to access (hereafter in method 200 referred to as the "message intended for the first user device").

Operation 234 includes obtaining the encrypted message intended for the first user device and an encrypted first group key from the central repository, e.g., a symmetric group key. It may be noted that, in some approaches, the encrypted message intended for the first user device was encrypted, e.g., by a browser of another user device, using the first group key. Furthermore, in one or more of such approaches, the encrypted first group key that is obtained from the central repository may preferably be the first group key encrypted using the first public key, e.g., the first public key stored to the central repository in operation 218.

With the encrypted message intended for the first user device is obtained from the central repository, a predetermined process may be performed for using the encrypted first private key stored on the predetermined NFC tag to decrypt the encrypted message intended for the first user device. In some approaches, the predetermined process for using the encrypted first private key stored on the predetermined NFC tag to decrypt the encrypted message intended for the first user device may include obtaining the encrypted first private key stored on the predetermined NFC tag.

In some preferred approaches, the first symmetric key is used to decrypt the encrypted first private key, e.g., see operation 238. The first symmetric key may be stored on a predetermined first user device and/or on the predetermined central repository. Accordingly, in some approaches, method 200 includes obtaining the first symmetric key, e.g., see operation 236. Furthermore, in order to obtain the encrypted first private key from the NFC tag, a determination must first be made that the NFC tag is at a predetermined location. In some preferred approaches, the predetermined location is within a predetermined distance of the first user device, e.g., contacting the first user device, within an inch or less of the first user device, within a foot of the first user device, etc. Accordingly, in such approaches, the first symmetric key is used to decrypt the encrypted first private key in response to a determination that the NFC tag is within a predetermined distance of the first user device.

Operation 240 includes using the decrypted first private key to decrypt the encrypted first group key. With the first group key decrypted, the decrypted first group key may then be used to decrypt the encrypted first message, e.g., see operation 242. For example, the browser of the first user device may be caused to use the decrypted first group key to decrypt the encrypted first message, and the decrypted first message may then be read by the browser and displayed on a display portion of the first user device.

Figure 3:
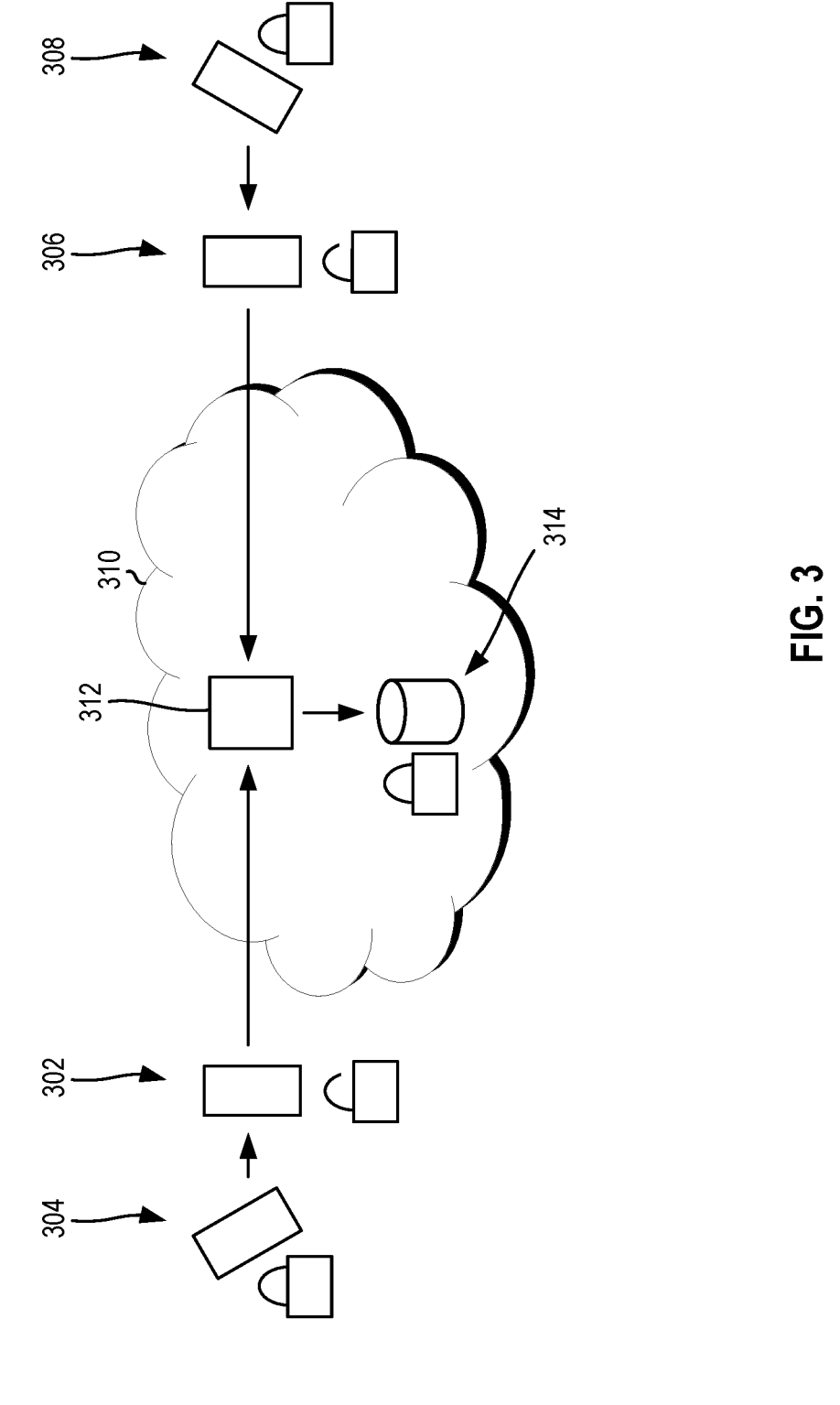
FIG. 3 is an environment, in accordance with one embodiment of the present invention.

FIG. 3 depicts an environment 300, in accordance with one embodiment. As an option, the present environment 300 may be implemented in conjunction with features from any other embodiment listed herein, such as those described with reference to the other FIGS. Of course, however, such environment 300 and others presented herein may be used in various applications and/or in permutations which may or may not be specifically described in the illustrative embodiments listed herein. Further, the environment 300 presented herein may be used in any desired environment.

The environment includes a first user device 302 and a first NFC tag 304 that contains an encrypted private key generated by the first user device 302. The environment may, in some approaches, include components, e.g., user devices, a server of the central repository, etc., that rely on the features of the open web standards "Web NFC API". Similarly, the environment includes a second user device 306 and a second NFC tag 308 that contains an encrypted private key generated by the second user device 306. The user devices may upload key information 314 to a predetermined central repository 310, e.g., a cloud server, of the environment. For example, a server 312 of the predetermined central repository 310 may include, e.g., encrypted group data, encrypted group key(s), client public keys, client NFC keys, etc. The only place data and keys become decrypted is in memory within the browser of the user devices.

Within the environment 300, the browsers may create asymmetric key pairs that are used for user authentication (client key pair). A given private key of the client key pair is stored on the NFC tags which may be read and written by the browser of the user device. Data on NFC tags is preferably encrypted using a symmetric key (client NFC key) and stored in the centralized repository. Message data is encrypted using a symmetric key (group key) which is encrypted using the public key of the authorized client key pair and stored in the centralized repository. In some approaches, the centralized repository only stores the encrypted message data, the encrypted group keys, the clients' NFC keys and clients' public keys. These aren't sufficient to decrypt the message data and the repository can reside in a zero trust infrastructure.

Figure 4A:
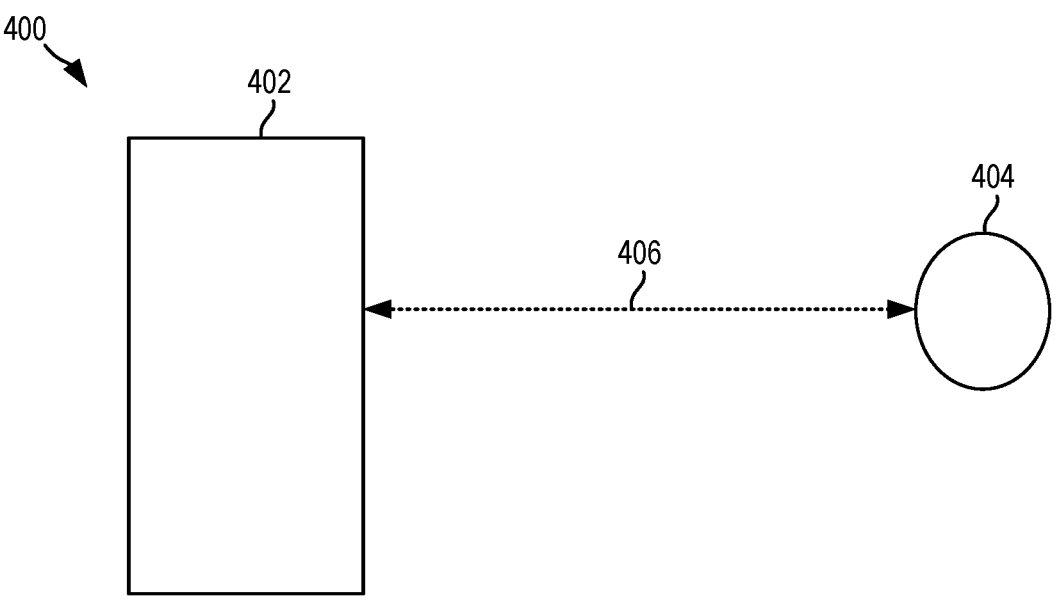
FIGS. 4A-4B is a system, in accordance with several embodiments of the present invention.
Figure 4B:
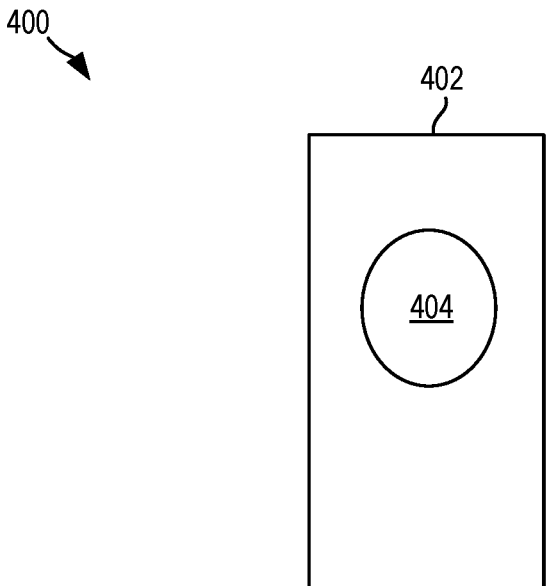

FIGS. 4A-4B depict a system 400, in accordance with several embodiments. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment.

Referring first to FIG. 4A, the system includes a user device 402 and an NFC tag 404. It may be assumed that an encrypted first private key is stored on the NFC tag, In order to access the encrypted first private key from the NFC tag, in some approaches, a determination must be made that the NFC tag is at a predetermined location. For example, the predetermined location may be within a predetermined distance of the user device. In FIG. 4A, a determination may be made that the NFC tag is not within the predetermined distance of the user device, e.g., the distance 406 is greater than the predetermined distance.

Referring now to FIG. 4B, a determination may be made that the NFC tag is within the predetermined distance of the user device, e.g., the NFC tag is contacting the user device, e.g., the NFC has been tapped on the user device. In response to the determination that the NFC tag is within the predetermined distance of the user device, a browser of the user device may receive and/or access the encrypted first private key stored on the NFC tag.

Figure 5:
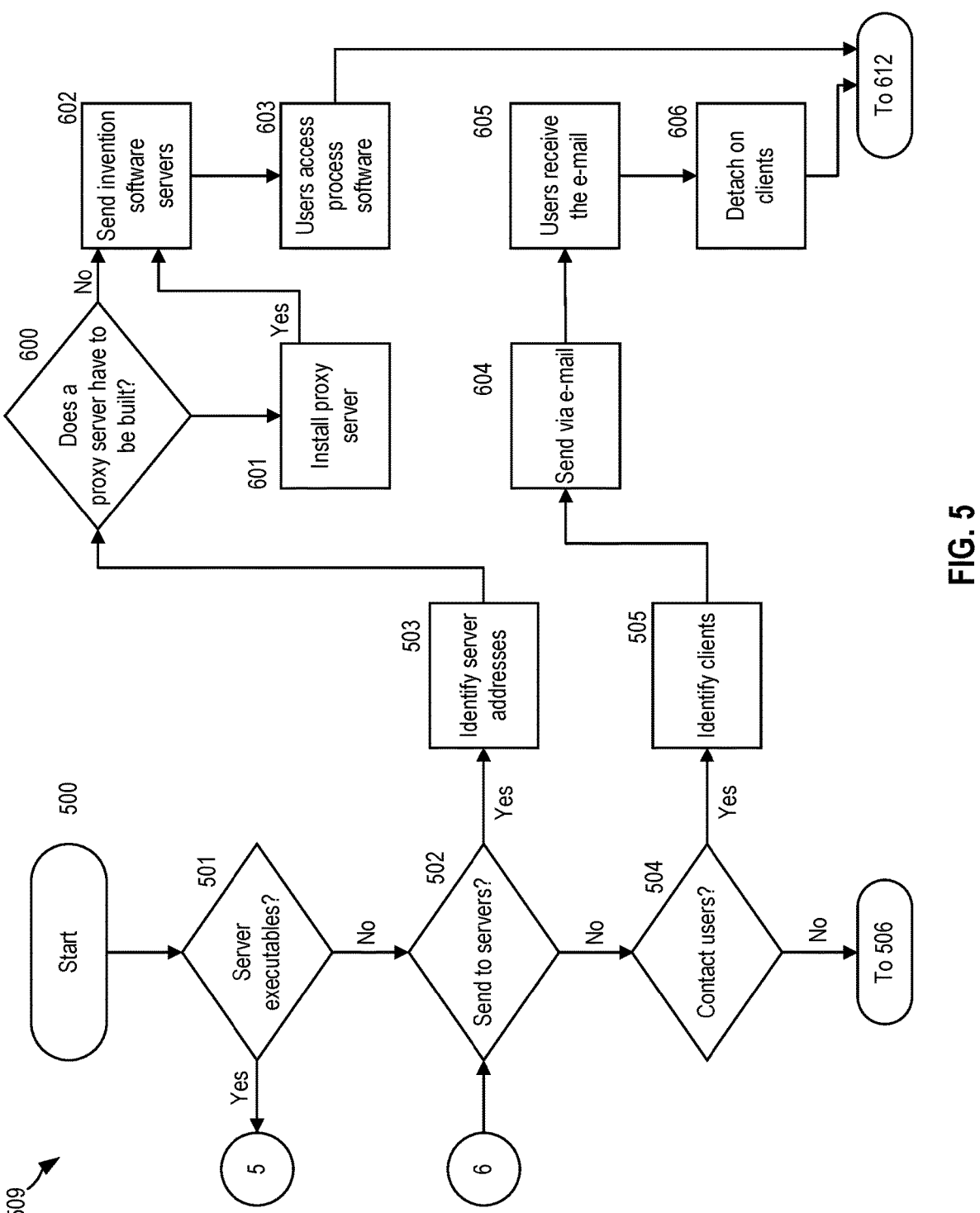
FIG. 5 is a flowchart of a method, in accordance with one embodiment of the present invention.
Figure 5:
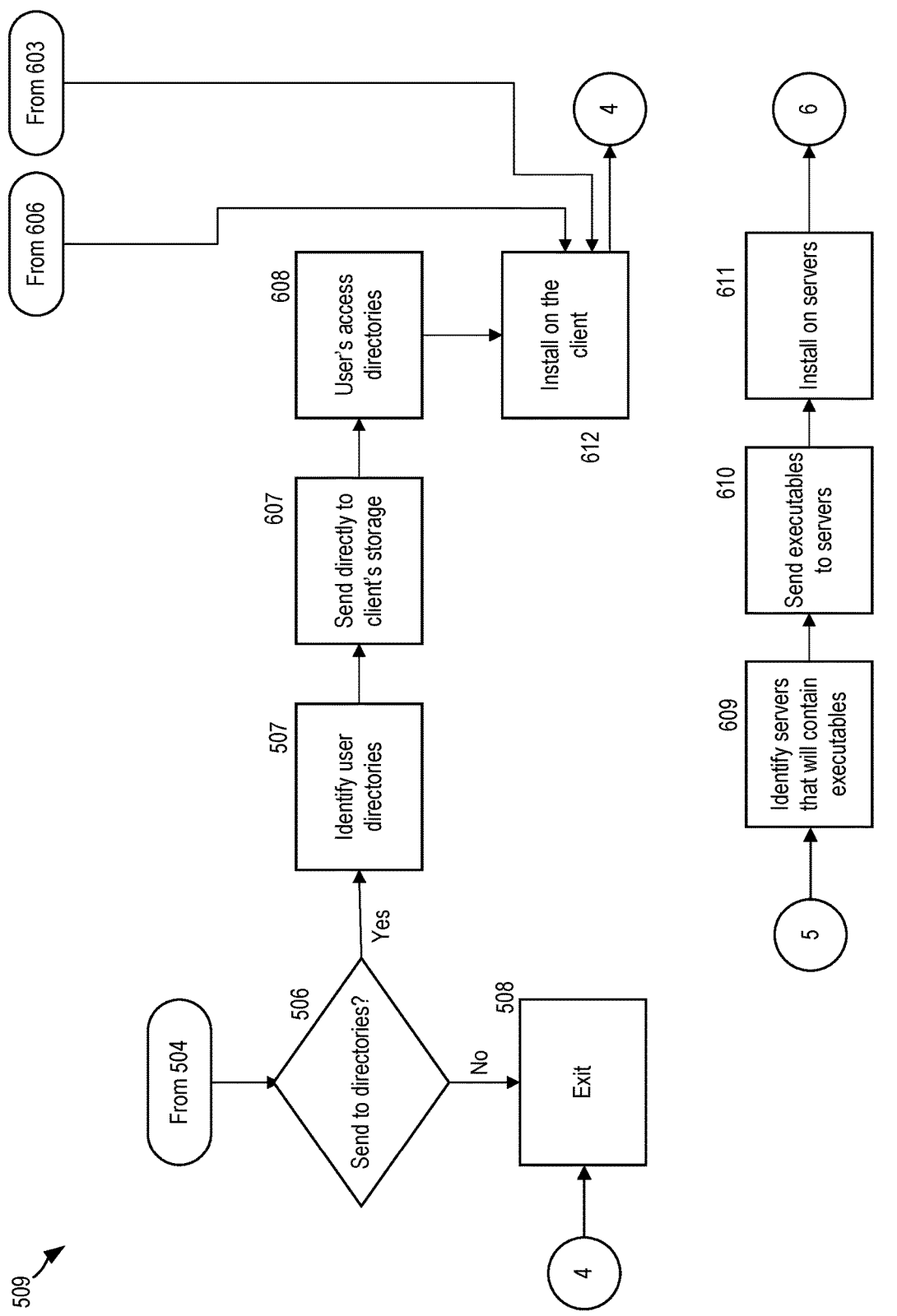

Now referring to FIG. 5, a flowchart of a method 509 is shown according to one embodiment. The method 509 may be performed in accordance with the present invention in any of the environments depicted in FIGS. 1-5, among others, in various embodiments. Of course, more or fewer operations than those specifically described in FIG. 5 may be included in method 509, as would be understood by one of skill in the art upon reading the present descriptions.

Each of the steps of the method 509 may be performed by any suitable component of the operating environment. For example, in various embodiments, the method 509 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 509. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software for encrypted end-to-end messaging using near-field communication (NFC) tags may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 500 begins the deployment of the process software. An initial step is to determine if there are any programs that will reside on a server or servers when the process software is executed (501). If this is the case, then the servers that will contain the executables are identified (609). The process software for the server or servers is transferred directly to the servers' storage via FTP or some other protocol or by copying though the use of a shared file system (610). The process software is then installed on the servers (611).

Next, a determination is made on whether the process software is to be deployed by having users access the process software on a server or servers (502). If the users are to access the process software on servers, then the server addresses that will store the process software are identified (503).

A determination is made if a proxy server is to be built (600) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (601). The process software is sent to the (one or more) servers either via a protocol such as FTP, or it is copied directly from the source files to the server files via file sharing (602). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (603). Another embodiment is to have the servers automatically copy the process software to each client and then run the installation program for the process software at each client computer. The user executes the program that installs the process software on his client computer (612) and then exits the process (508).

In step 504 a determination is made whether the process software is to be deployed by sending the process software to users via e-mail. The set of users where the process software will be deployed are identified together with the addresses of the user client computers (505). The process software is sent via e-mail (604) to each of the users' client computers. The users then receive the e-mail (605) and then detach the process software from the e-mail to a directory on their client computers (606). The user executes the program that installs the process software on his client computer (612) and then exits the process (508).

Lastly, a determination is made on whether the process software will be sent directly to user directories on their client computers (506). If so, the user directories are identified (507). The process software is transferred directly to the user's client computer directory (607). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (608). The user executes the program that installs the process software on his client computer (612) and then exits the process (508).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
using a first symmetric key to encrypt a first private key of a first asymmetric key pair;
storing the encrypted first private key on a predetermined near-field communication (NFC) tag;
storing a first public key of the first asymmetric key pair and the first symmetric key on a predetermined central repository;
obtaining an encrypted first message and an encrypted first group key from the central repository, wherein the encrypted first message was encrypted using the first group key, wherein the encrypted first group key is the first group key encrypted using the first public key;
using the encrypted first private key stored on the predetermined NFC tag to decrypt the encrypted first message,
wherein using the encrypted first private key to decrypt the encrypted first message includes:
using the first symmetric key to decrypt the encrypted first private key;
using the first private key to decrypt the encrypted first group key; and
using the first group key to decrypt the encrypted first message; and
storing the first symmetric key to a predetermined first user device,
wherein the first symmetric key is used to decrypt the encrypted first private key in response to a determination that the NFC tag is within a predetermined distance of the first user device.

2. The computer-implemented method of claim 1, wherein the first user device is a laptop computer.

3. The computer-implemented method of claim 1, comprising:
accessing, on the central repository, a second public key;
creating a second group key;
using the second group key to encrypt a second message intended for a second user device;
using the second public key to encrypt the second group key; and
storing the encrypted second message and the encrypted second group key to the central repository for the second user device.

4. The computer-implemented method of claim 3, wherein the second public key is stored on the central repository by the second user device.

5. The computer-implemented method of claim 1, wherein the central repository is public cloud storage, wherein the NFC tag is configured to be coupled to a keychain and/or identification badge for carrying by a user associated with the first user device, wherein the encrypted first private key is not stored on the first user device, wherein the encrypted first message and the encrypted first private key and the encrypted first group key are only decrypted in memory within a browser of the first user device.

6. A computer program product, the computer program product comprising a computer readable storage medium having program instructions embodied therewith, the program instructions readable and/or executable by a computer to cause the computer to:

use a first symmetric key to encrypt a first private key of a first asymmetric key pair;

store the encrypted first private key on a predetermined near-field communication (NFC) tag;

store a first public key of the first asymmetric key pair and the first symmetric key on a predetermined central repository;

obtain an encrypted first message and an encrypted first group key from the central repository, wherein the encrypted first message was encrypted using the first group key, wherein the encrypted first group key is the first group key encrypted using the first public key;

use the encrypted first private key stored on the predetermined NFC tag to decrypt the encrypted first message, wherein using the encrypted first private key to decrypt the encrypted first message includes:

using the first symmetric key to decrypt the encrypted first private key;

using the first private key decrypt the encrypted first group key; and using the first group key to decrypt the encrypted first message; and store the first symmetric key to a predetermined first user device, wherein the first symmetric key is used to decrypt the encrypted first private key in response to a determination that the NFC tag is within a predetermined distance of the first user device.

7. The computer program product of claim 6, wherein the first user device is a laptop computer.

8. The computer program product of claim 7, the program instructions readable and/or executable by the computer to cause the computer to:

access, on the central repository, a second public key;

create a second group key;

use the second group key to encrypt a second message intended for a second user device;

use the second public key to encrypt the second group key; and store the encrypted second message and the encrypted second group key to the central repository for the second user device.

9. The computer program product of claim 8, wherein the second public key is stored on the central repository by the second user device.

10. The computer program product of claim 9, wherein the central repository is public cloud storage, wherein the NFC tag is configured to be coupled to a keychain and/or identification badge for carrying by a user associated with the first user device, wherein the encrypted first private key is not stored on the first user device, wherein the encrypted first message and the encrypted first private key and the encrypted first group key are only decrypted in memory within a browser of the first user device.

11. A system, a processor; and logic integrated with the processor, executable by the processor, or integrated with and executable by the processor, the logic being configured to:

use a first symmetric key to encrypt a first private key of a first asymmetric key pair, store the encrypted first private key on a predetermined near-field communication (NFC) tag;

store a first public key of the first asymmetric key pair and the first symmetric key on a predetermined central repository;

obtain an encrypted first message and an encrypted first group key from the central repository, wherein the encrypted first message was encrypted using the first group key, wherein the encrypted first group key is the first group key encrypted using the first public key;

use the encrypted first private key stored on the predetermined NFC tag to decrypt the encrypted first message, wherein using the encrypted first private key to decrypt the encrypted first message includes:

using the first symmetric key to decrypt the encrypted first private key;

using the first private key decrypt the encrypted first group key; and using the first group key to decrypt the encrypted first message; and store the first symmetric key to a predetermined first user device, wherein the first symmetric key is used to decrypt the encrypted first private key in response to a determination that the NFC tag is within a predetermined distance of the first user device.

12. The system of claim 11, wherein the first user device is a laptop computer.

13. The system of claim 12, the logic being configured to:

access, on the central repository, a second public key;

create a second group key;

use the second group key to encrypt a second message intended for a second user device;

use the second public key to encrypt the second group key; and store the encrypted second message and the encrypted second group key to the central repository for the second user device.

14. The system of claim 11, wherein the central repository is public cloud storage.

* * * * *